(12) United States Patent
Chen

(10) Patent No.: US 10,641,368 B2
(45) Date of Patent: May 5, 2020

(54) BALL SCREW AND METHOD FOR USING THE SAME

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 155 days.

(21) Appl. No.: 15/979,464

(22) Filed: May 15, 2018

(65) Prior Publication Data

US 2019/0353231 A1 Nov. 21, 2019

(51) Int. Cl.
*F16H 25/22* (2006.01)
*F16H 25/24* (2006.01)

(52) U.S. Cl.
CPC ..... *F16H 25/2214* (2013.01); *F16H 25/2418* (2013.01)

(58) Field of Classification Search
CPC ............. F16H 25/2214; F16H 25/2418; F16H 25/2204
See application file for complete search history.

(56) References Cited

U.S. PATENT DOCUMENTS

| 2002/0144560 | A1* | 10/2002 | Yatsushiro | .......... | F16H 25/2418 74/89.4 |
| 2006/0076214 | A1* | 4/2006 | Yang | .................... | F16H 25/2418 198/468.9 |
| 2007/0221003 | A1* | 9/2007 | Chen | .................... | F16H 25/2214 74/424.86 |
| 2008/0121056 | A1* | 5/2008 | Tsou | .................... | F16H 25/2214 74/89.44 |
| 2017/0146114 | A1* | 5/2017 | Chen | .................... | F16H 57/0497 |

* cited by examiner

*Primary Examiner* — David H Bollinger
(74) *Attorney, Agent, or Firm* — Che-Yang Chen; Law Office of Michael Chen

(57) ABSTRACT

A ball screw includes a screw having a primary spiral groove. A first nut unit includes a first nut and first balls. The first nut has a first spiral groove. The first balls are located in the first spiral groove and contact the inner surface of the first spiral groove by a first contact angle. A second nut unit includes a second nut and second balls. The second nut has a second spiral groove. The second balls are located in the second spiral groove and contact the inner surface of the second spiral groove by a second contact angle which is different from the first contact angle. When a first wearing trace is formed along the screw by the first balls, the first nut unit is replaced with the second nut unit. A second wearing trace is formed along the screw and not overlapped with the first wearing trace.

6 Claims, 12 Drawing Sheets

BALL SCREW AND METHOD FOR USING THE SAME

BACKGROUND OF THE INVENTION

1. Fields of the Invention

The present invention relates to a ball screw, and more particularly, to a ball screw and a method for using the same.

2. Descriptions of Related Art

The conventional ball screw includes a screw, a nut and multiple balls, wherein the ball are rotatably located between the screw and the nut to transfer the rotational action of the balls to linear action of the nut. The ball screw includes the features of precise positioning, long life of use, lower contamination and easily change of rotational directions. The ball screw is widely used in the fields of precision manufacturing, precision lathes, and positioning and measurement.

In order to increase the precision of the ball screw, a pre-set pressure is applied to the ball screw when assembling to allow the balls to contact the screw and the nut at a contact angle. However, after a period time of use, the balls are worn out, and a wearing traces is formed at the position at the contact angle between the balls, the nut and the screw. The wearing trance reduces precision of positioning and moving of the screw.

Generally, the whole set of the ball screw including the screw, the nut and the balls are replaced to ensure the desired features. Nevertheless, the replacement means high cost for the users. The screw requires high standard of manufacturing and is the most expensive part among the parts of the ball screw, so that the frequent replacement of the screw reduces competition.

The present invention intends to provide a ball screw to eliminate the drawbacks mentioned above.

SUMMARY OF THE INVENTION

The present invention relates to a ball screw and comprises a screw having a primary spiral groove defined in the outer surface thereof. A first nut unit has a first nut and multiple first balls. The first nut has a first passage. A first spiral groove is defined in the inner surface of the first passage. The first balls are located in the first spiral groove and contact the inner surface of the first spiral groove by a first contact angle. The first contact angles that are respectively located diametrically opposite to each other are in opposite directions. A second nut unit has a second nut and multiple second balls. The second nut has a second passage. A second spiral groove is defined in the inner surface of the second passage. The second balls are located in the second spiral groove and contact the inner surface of the second spiral groove by a second contact angle. The second contact angles that are respectively located diametrically opposite to each other are in opposite directions. The first contact angle is different from the second contact angle. The first nut unit and the second nut unit are alternatively cooperated with the screw. When two first wearing traces are formed along the inner surface of the primary spiral groove by the first nut unit, the first nut unit is replaced with the second nut unit. Two second wearing traces are formed along the inner surface of the primary spiral groove by the second nut unit, and the first and second wearing traces are not overlapped with each other.

The present invention also provides a method for a using ball screw, and the method comprises:

a step of having a screw: The screw has a primary groove.

a step of having a first nut unit: The first nut unit has at least one first nut and multiple first balls. The at least one first nut has a first passage. The screw extends through the first passage, and the first passage has a first spiral groove defined in the inner surface thereof. The first balls are located in the first spiral groove, and the first balls contact the inner surface of the first spiral groove by a first contact angle.

a step of having a second nut unit: The second nut unit has at least one second nut and multiple second balls. The at least one second nut has a second passage, and the second passage has a second spiral groove defined in the inner surface thereof. The second balls are located in the second spiral groove, and the second balls contact the inner surface of the second spiral groove by a second contact angle which is different from the first contact angle.

a step of replacing the first nut unit with the second nut unit: When a first wearing trace is formed along the screw by the first balls, the first nut unit is removed from the screw, and the second nut unit is connected to the screw. The second nut unit is removed from the screw when a second wearing trace is formed along the screw by the second balls. The first and second wearing traces are not overlapped with each other.

The primary objective of the present invention is to provide a ball screw and a method for using the ball screw, and the life of use of the screw is prolonged and the cost for maintenance of the linear slide rail is reduced.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
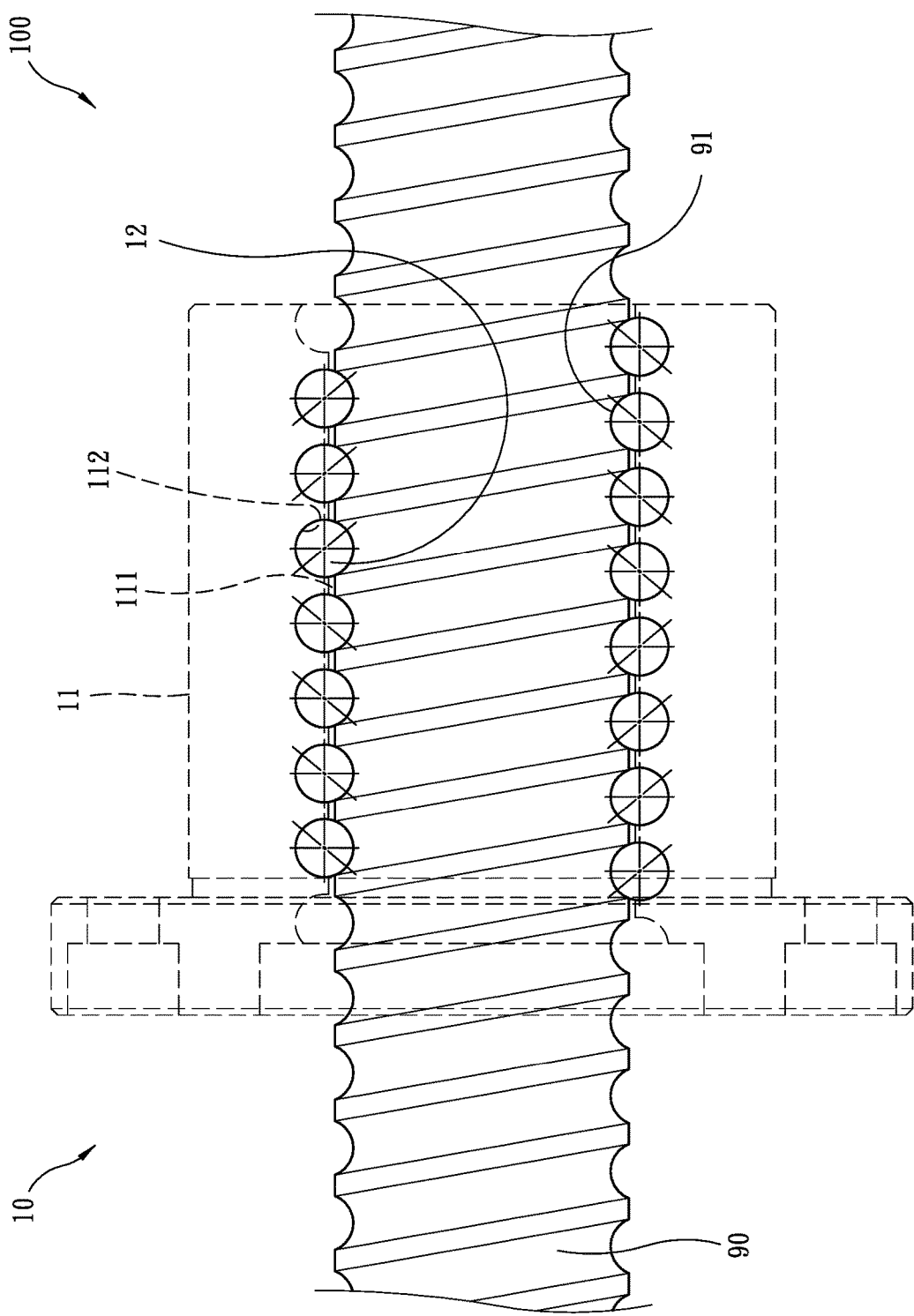
FIG. 1 shows the first embodiment of the ball screw of the present invention.

Referring to FIGS. 1 to 7, the first embodiment of the ball screw 100 of the present invention comprises a screw 90, a first nut unit 10, a second nut unit 20 and a third nut unit 30.

Figure 2:
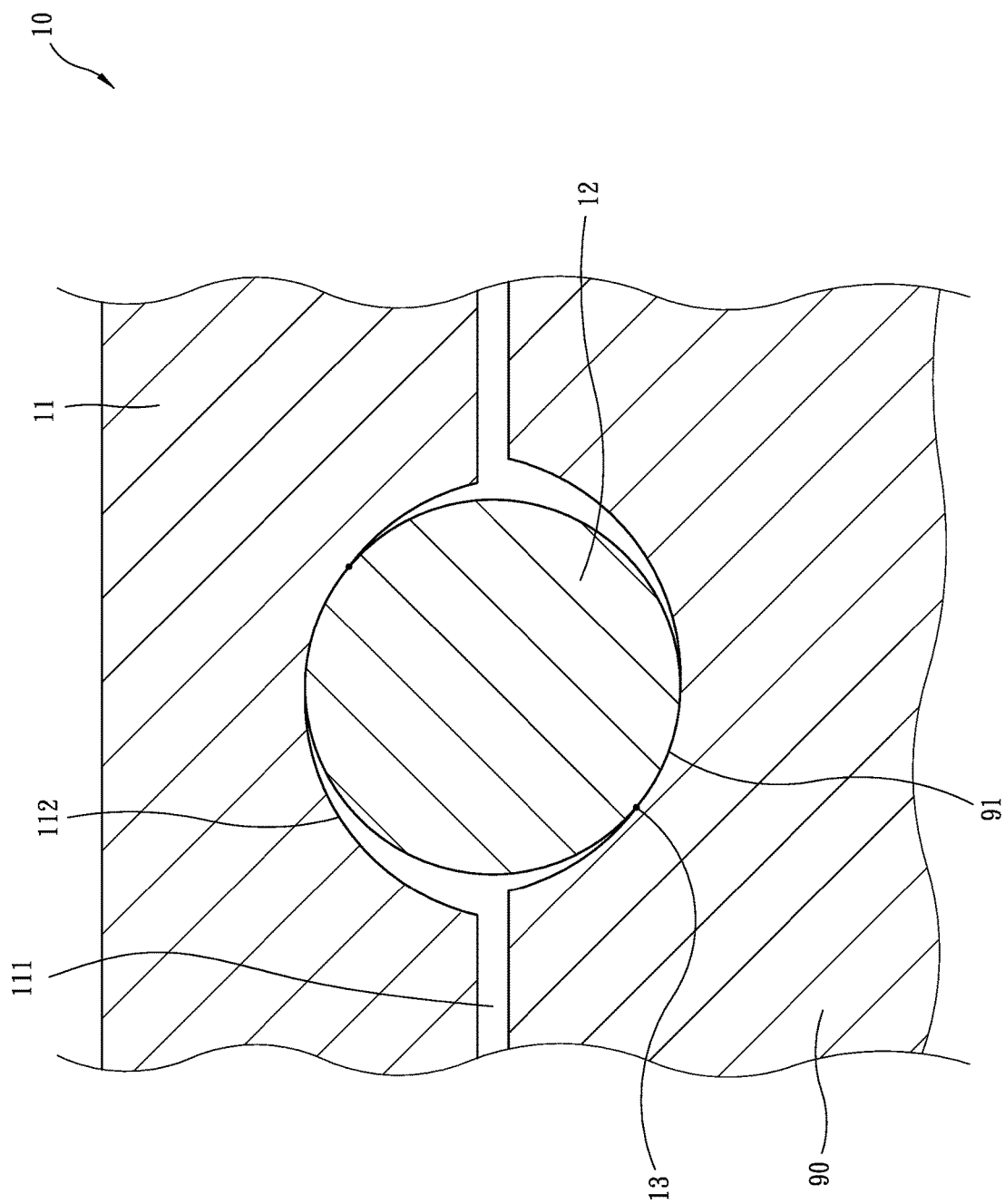
FIG. 2 is a cross sectional view to show a portion of the first nut and the first ball which contacts the first spiral groove of the first nut by the first contact angle.

The screw 90 has a primary spiral groove 91 defined in the outer surface thereof as shown in FIGS. 1 and 2.

Figure 4:
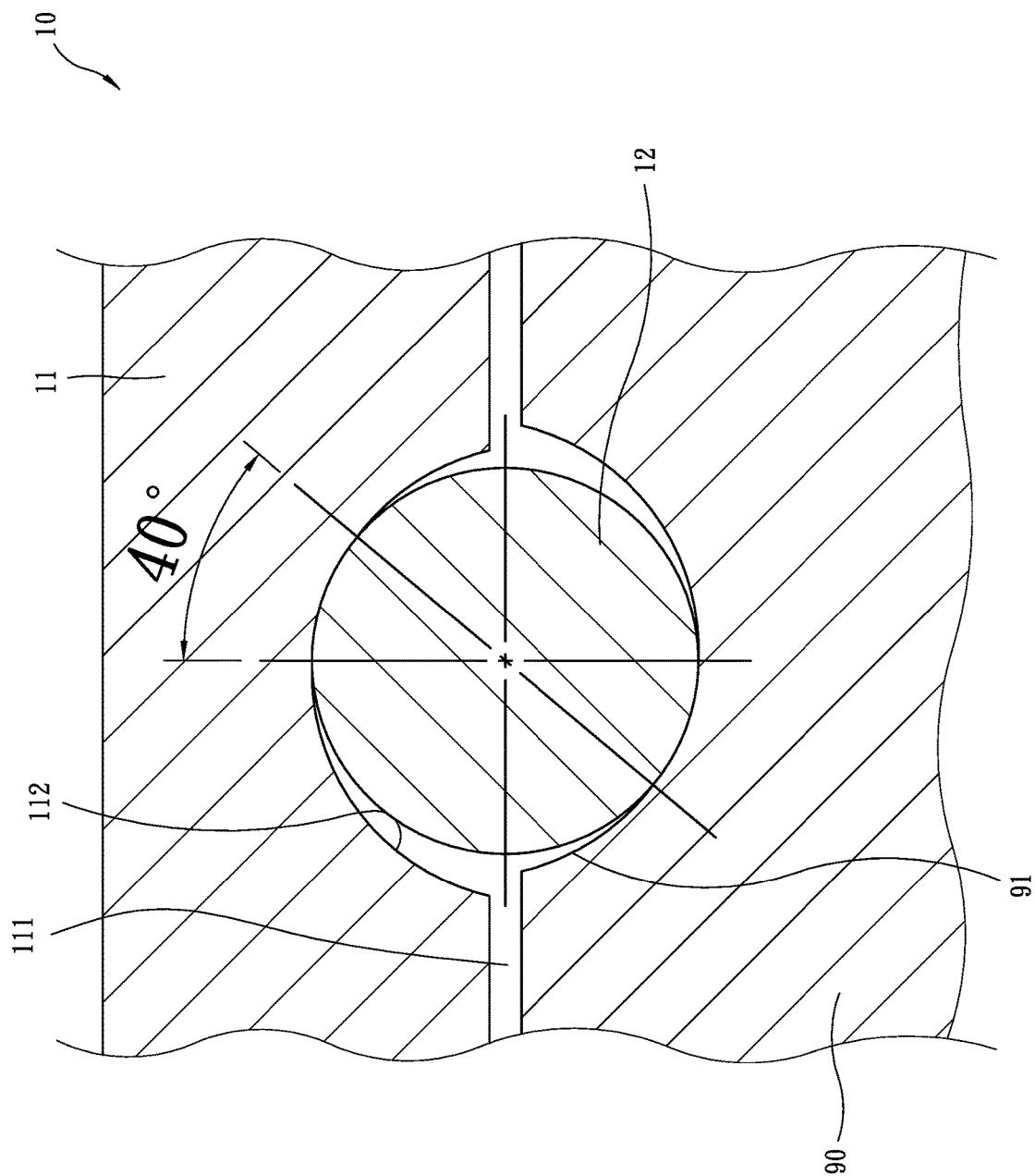
FIG. 4 shows that the first contact angle in FIG. 1 is 40 degrees.

As shown in FIGS. 1 and 4, the first nut unit 10 comprises a first nut 11 and multiple first balls 12, wherein the first nut 11 has a first passage 111, and a first spiral groove 112 is defined in the inner surface of the first passage 111. The first balls 12 are located in the first spiral groove 112 and contact the inner surface of the first spiral groove 112 by a first contact angle which is 40 degrees. The first contact angles that are respectively located diametrically opposite to each other are in opposite directions as shown in FIG. 1.

Figure 5:
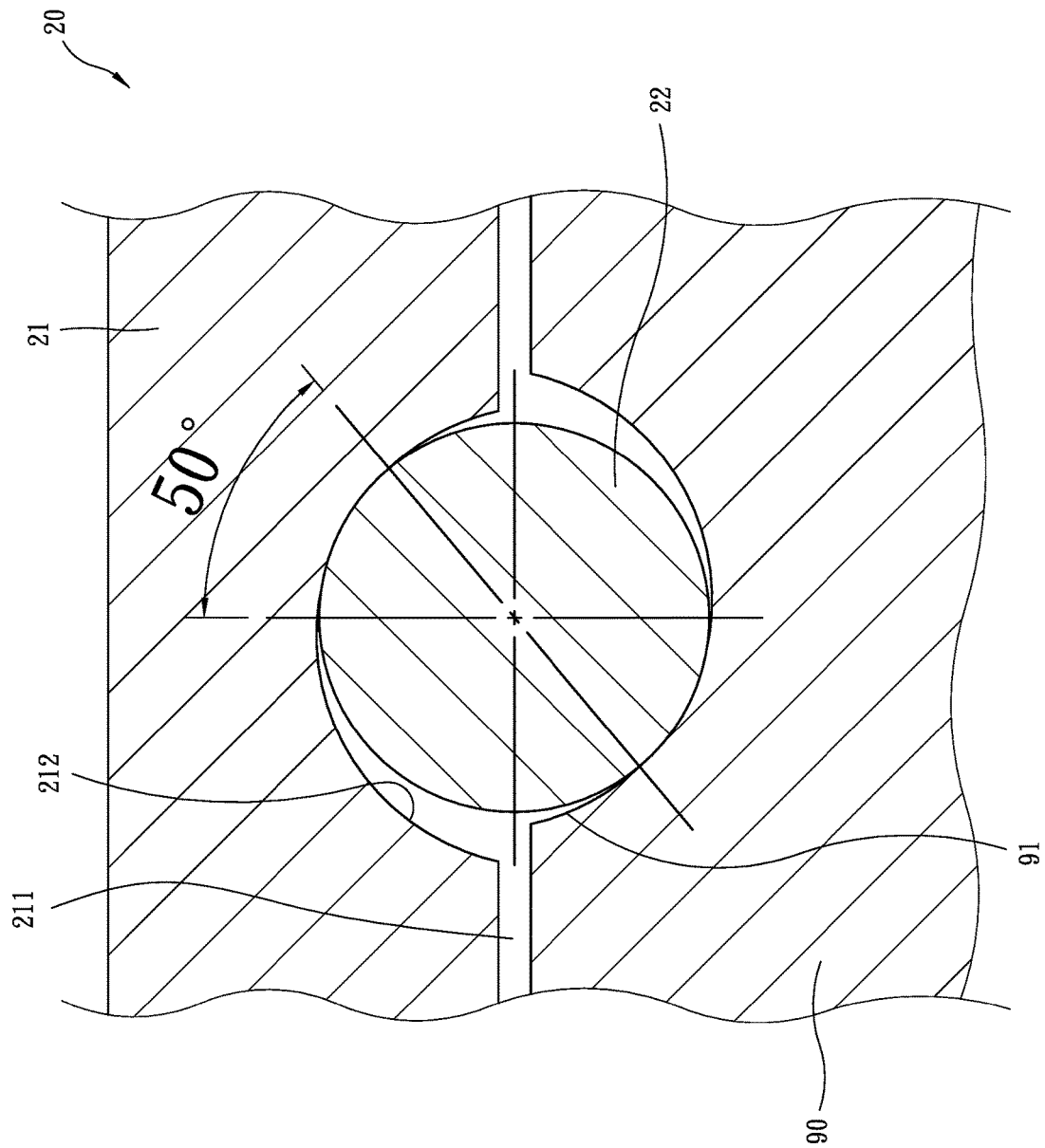
FIG. 5 shows that the second contact angle is 50 degrees.

As shown in FIG. 5, the second nut unit 20 comprises a second nut 21 and multiple second balls 22. The second nut 21 has a second passage 211, and a second spiral groove 212 is defined in the inner surface of the second passage 211. The second balls 22 are located in the second spiral groove 212 and contact the inner surface of the second spiral groove 212 by a second contact angle which is 50 degrees. The second contact angles that are respectively located diametrically opposite to each other being in opposite directions.

Figure 6:
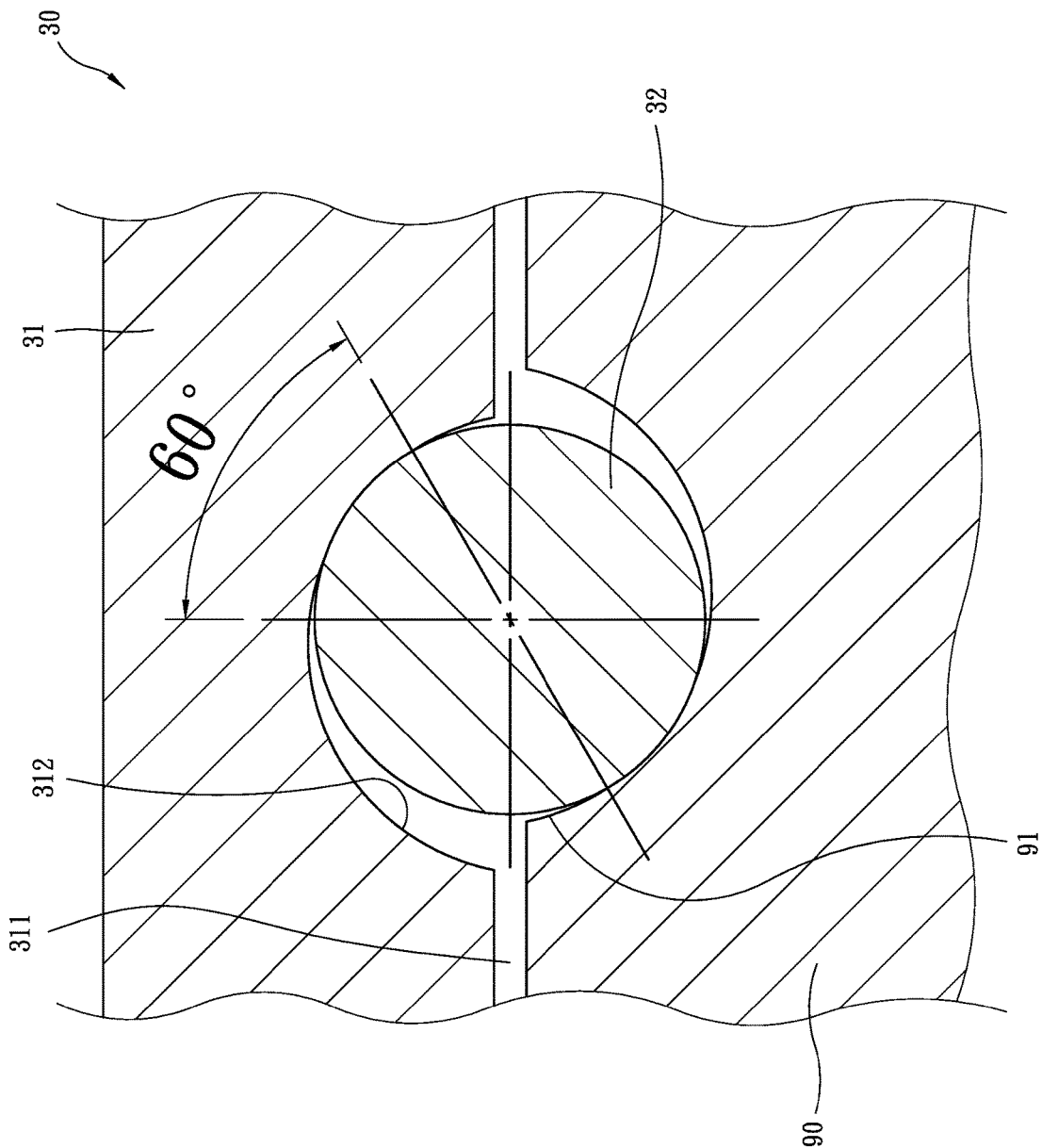
FIG. 6 shows that the third contact angle is 60 degrees.

As shown in FIG. 6, the present invention also comprises a third nut unit 30 which includes a third nut 31 and multiple third balls 32. The third nut 31 has a third passage 311, and a third spiral groove 312 is defined in the inner surface of the third passage 311. The third balls 32 are located in the third spiral groove and contact the inner surface of the third spiral groove 312 by a third contact angle which is 60 degrees. The third contact angles that are respectively located diametrically opposite to each other being in opposite directions.

When in use, the screw 90 extends through the first passage 111 of the first nut 11 of the first nut unit 10, and the first balls 12 are located in the primary spiral groove 91 and the first spiral groove 112. A pre-set pressure is applied to the screw 90 and the first nut unit 10, to allow the first balls 12 to contact the primary spiral groove 91 and the first spiral groove 112 as shown in FIG. 4. The first contact angle is 40 degrees. The second and third nut units 20, 30 are prepared.

Figure 3:
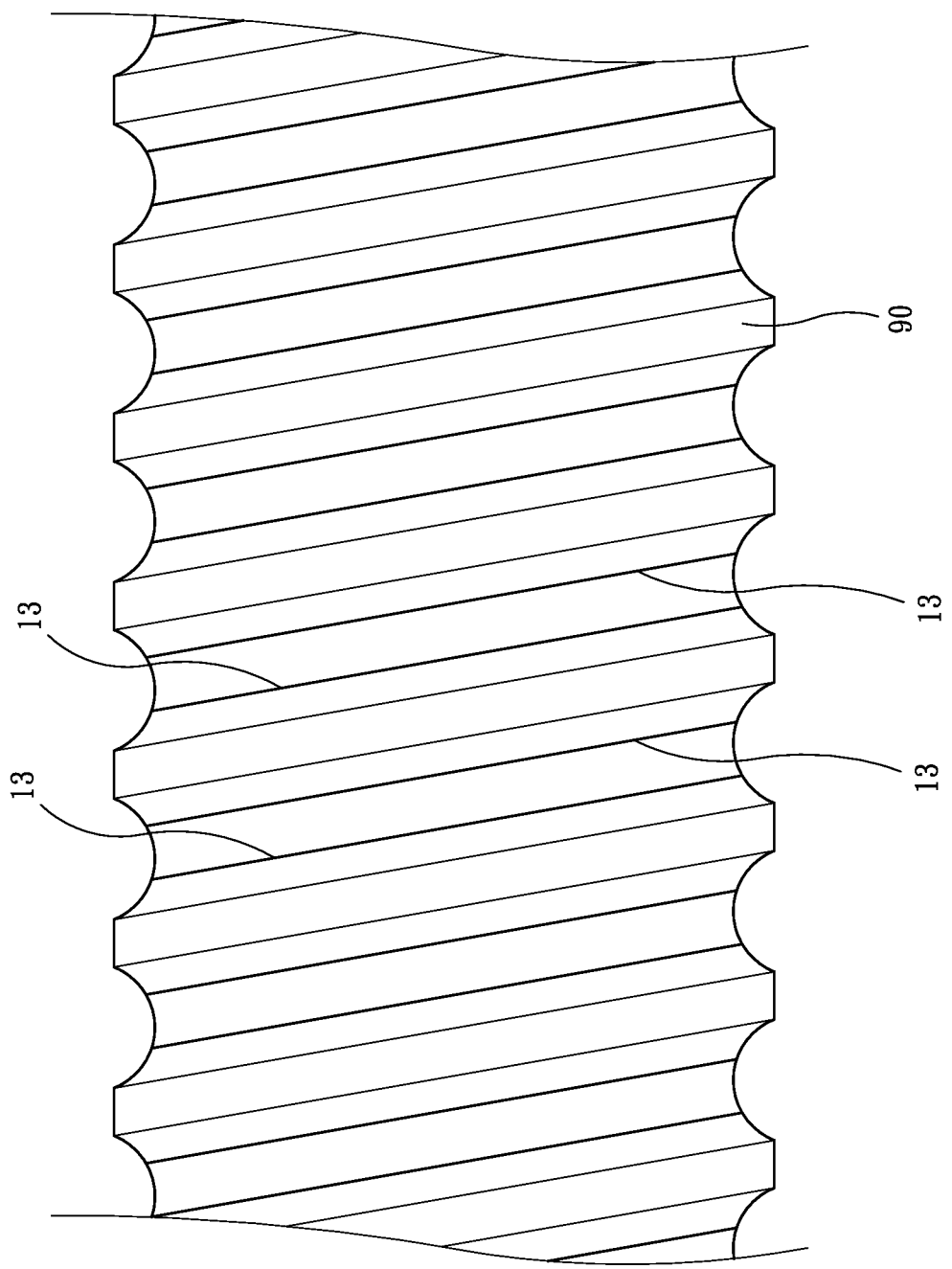
FIG. 3 shows the first wearing traces are formed along the screw.

When two first wearing traces 13 are formed along the inner surface of the primary spiral groove 91 by the first balls 12 of the first nut unit 10 as shown in FIGS. 2 and 3. The inner surface of the first spiral groove 112 of the first nut 11 have also the first wearing traces 13 formed, and the precision of the ball screw 100 reduces. The first nut unit 10 is removed from the screw 90.

The screw 90 then extends through the second passage 211 of the second nut unit 20, the second balls 22 are located in the primary spiral groove 91 and the second spiral groove 212. A pre-set pressure is applied to the screw 90 and the second nut unit 20, to allow the second balls 22 to contact the primary spiral groove 91 and the second spiral groove 212 as shown in FIG. 5. The second contact angle is 50 degrees.

Figure 7:
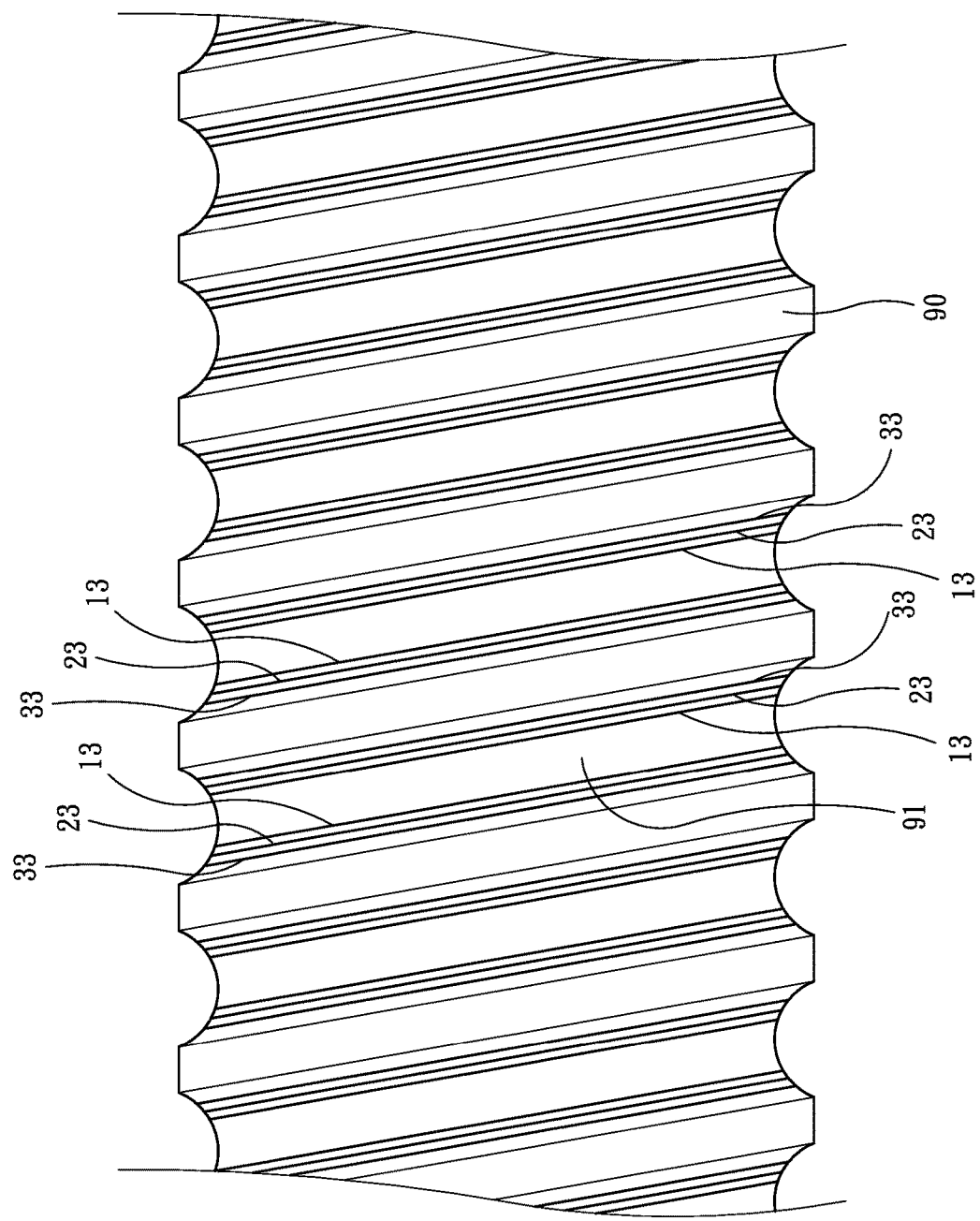
FIG. 7 shows the first, second and third wearing traces are formed along the screw.
Figure 8:
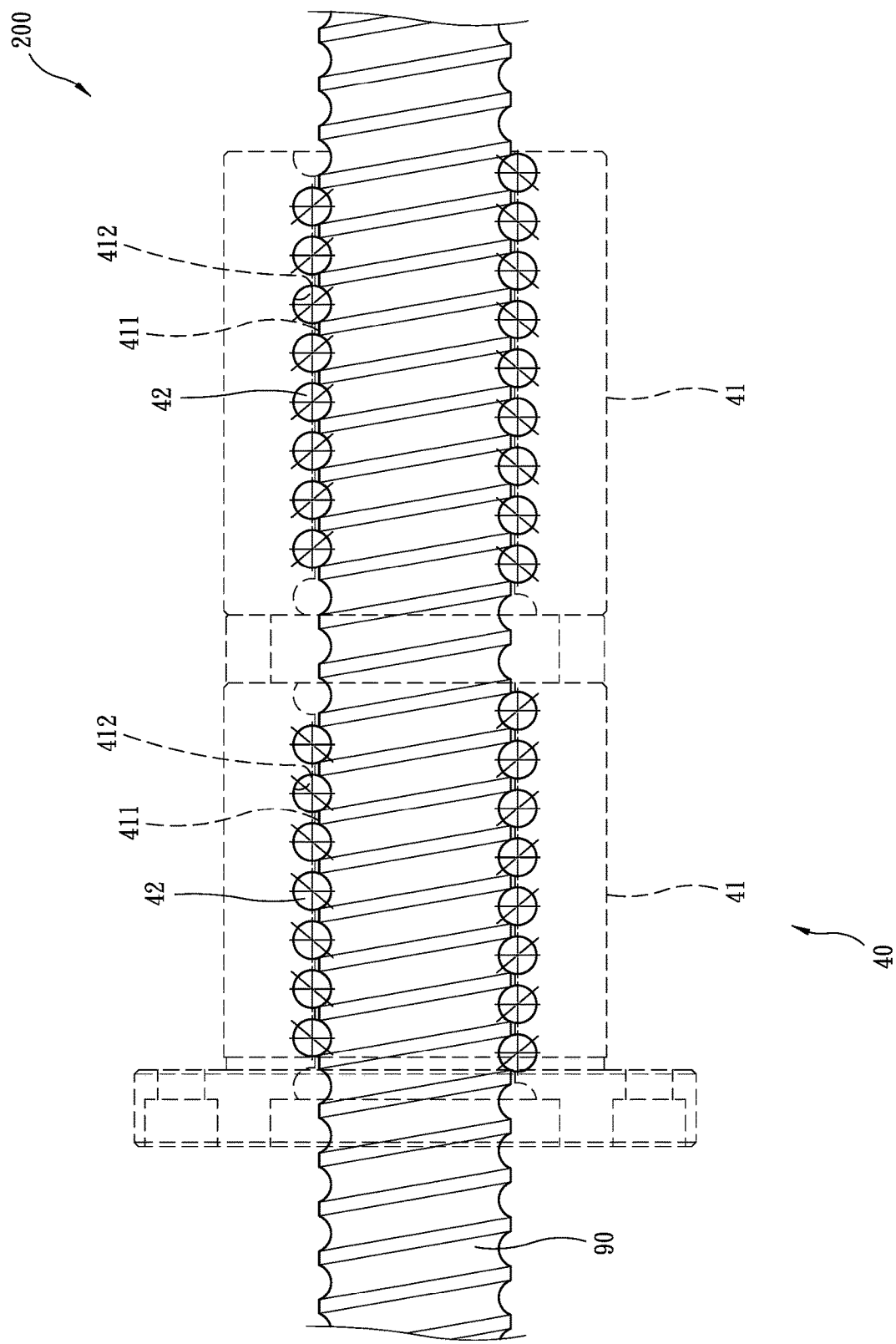
FIG. 8 shows the second embodiment of the ball screw of the present invention.

When two second wearing traces 23 are formed along the inner surface of the primary spiral groove 91 by the second balls 22 of the second nut unit 20 as shown in FIG. 7 after the ball screw 100 is used for a period of time. The inner surface of the second spiral groove 212 of the second nut 21 have also the second wearing traces 23 formed, and the precision of the ball screw 100 reduces. The second nut unit 20 is removed from the screw 90.

The screw 90 then extends through the third passage 311 of the third nut unit 30, and the third balls 32 are located in the primary spiral groove 91 and the third spiral groove 312. A pre-set pressure is applied to the screw 90 and the third nut unit 30, to allow the third balls 3 to contact the primary spiral groove 91 and the third spiral groove 312 as shown in FIG. 6. The third contact angle is 60 degrees.

After the ball screw 100 is used for a period of time, two third wearing traces 33 are formed along the inner surface of the primary spiral groove 91 by the third balls 32 of the third nut unit 30 as shown in FIG. 7. The inner surface of the third spiral groove 312 of the third nut 31 have also the third wearing traces 33 formed, and the precision of the ball screw 100 reduces. The third nut unit 30 is removed from the screw 90. A new ball screw 100 is then used. The first, second and third wearing traces 13, 23, 33 are not overlapped to each other.

The first contact angle of the first nut unit 10 is 40 degrees, the second contact angle of the second nut unit 20 is 50 degrees, and the third contact angle of the third nut unit 30 is 60 degrees. The three different contact angles create the first, second and third wearing traces 13, 23, 33 on the screw 90, and the first, second and third wearing traces 13, 23, 33 are not overlapped with each other. Therefore, the screw 90 can be respectively cooperated with the first nut unit 10, the second nut unit 20 and the third nut unit 30 without worry of affecting the precision. The life of use of the screw 90 is triple than the conventional ones so that the cost for the screw 90 is reduced.

Figure 9:
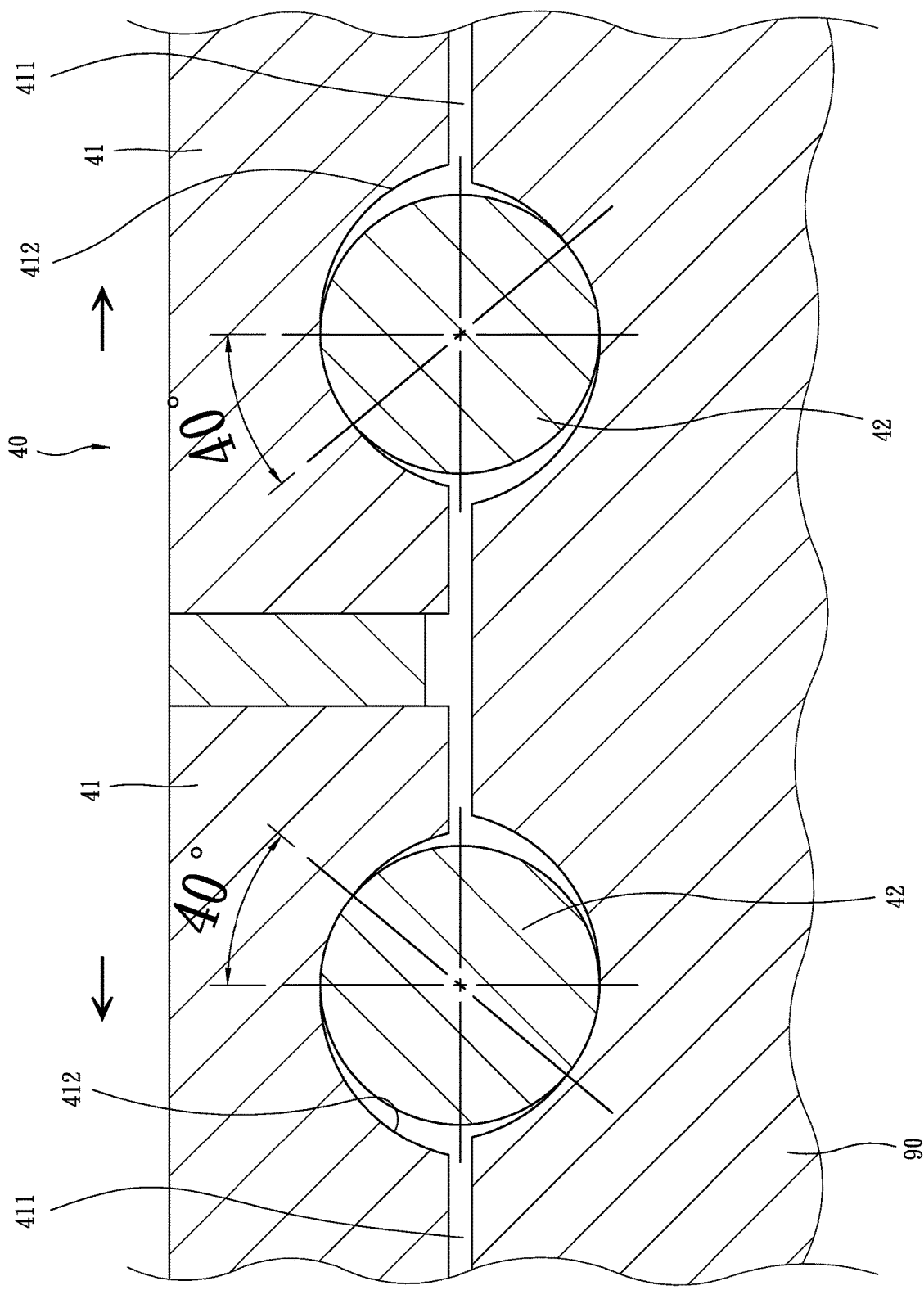
FIG. 9 shows that the two first contact angles of the second embodiment of the present invention is 40 degrees.

As shown in FIGS. 8 to 12, the second embodiment of the ball screw 200 of the present invention is disclosed. The second embodiment comprises a screw 90, a first dual nut unit 40, a second dual nut unit 50 and a third dual nut unit 60. The differences from the first embodiment are that the first dual nut unit 40 has two first nuts 41 and multiple first balls 42. The two first nuts 41 are integral with each other. Each first nut 41 has a first passage 411 and a first spiral groove 412 defined in the inner surface of the first passage 411. The first balls 42 are located in the first spiral groove 412 and contact the inner surface of the first spiral groove 412 of each first nut 41 by a first contact angle which is 40 degrees. The two first contact angles that are respectively located in the two first nuts 41 are opposite to each other being in opposite directions as shown in FIG. 9.

Figure 10:
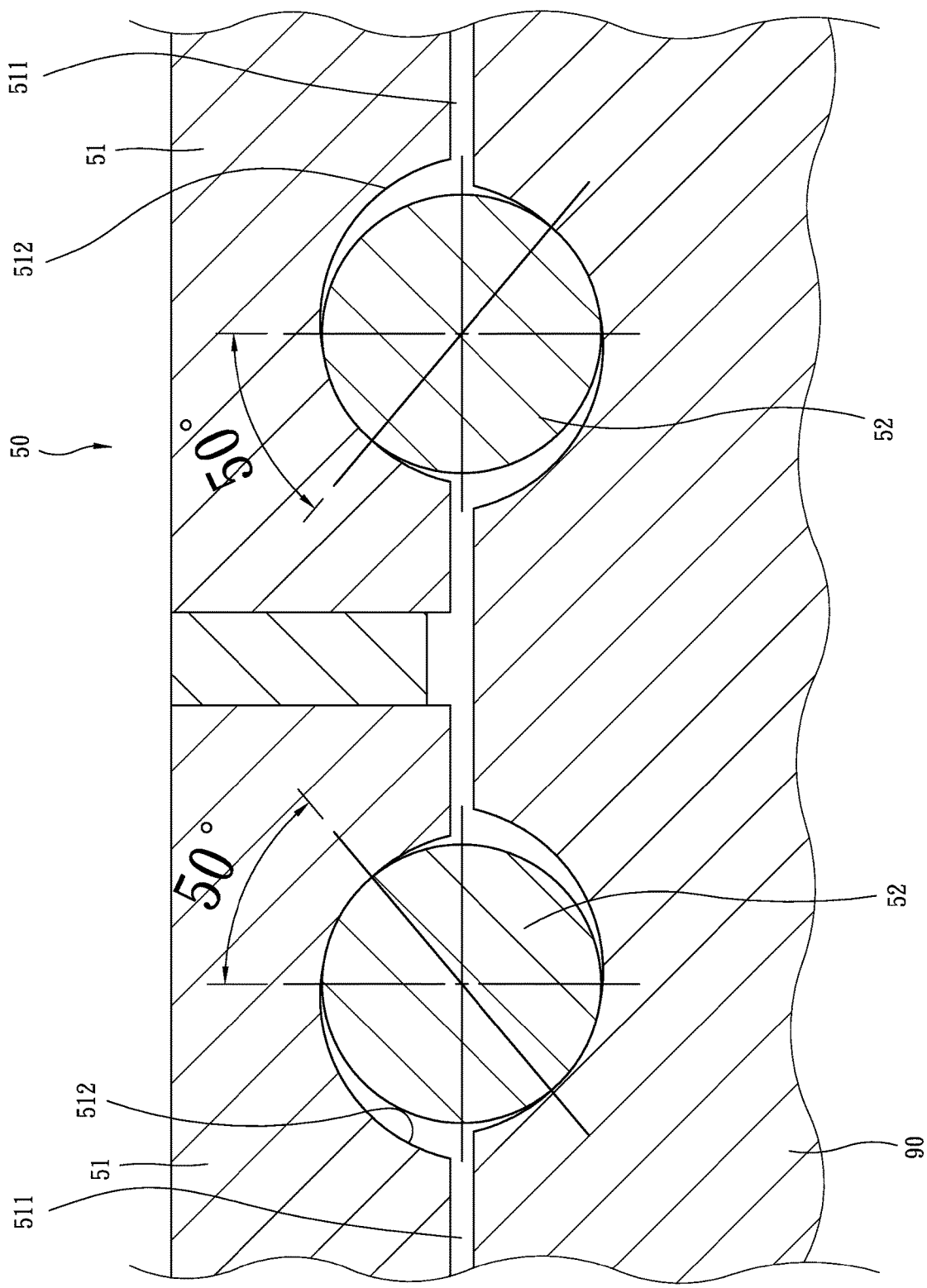
FIG. 10 shows that the two second contact angles of the second embodiment of the present invention is 50 degrees.
Figure 11:
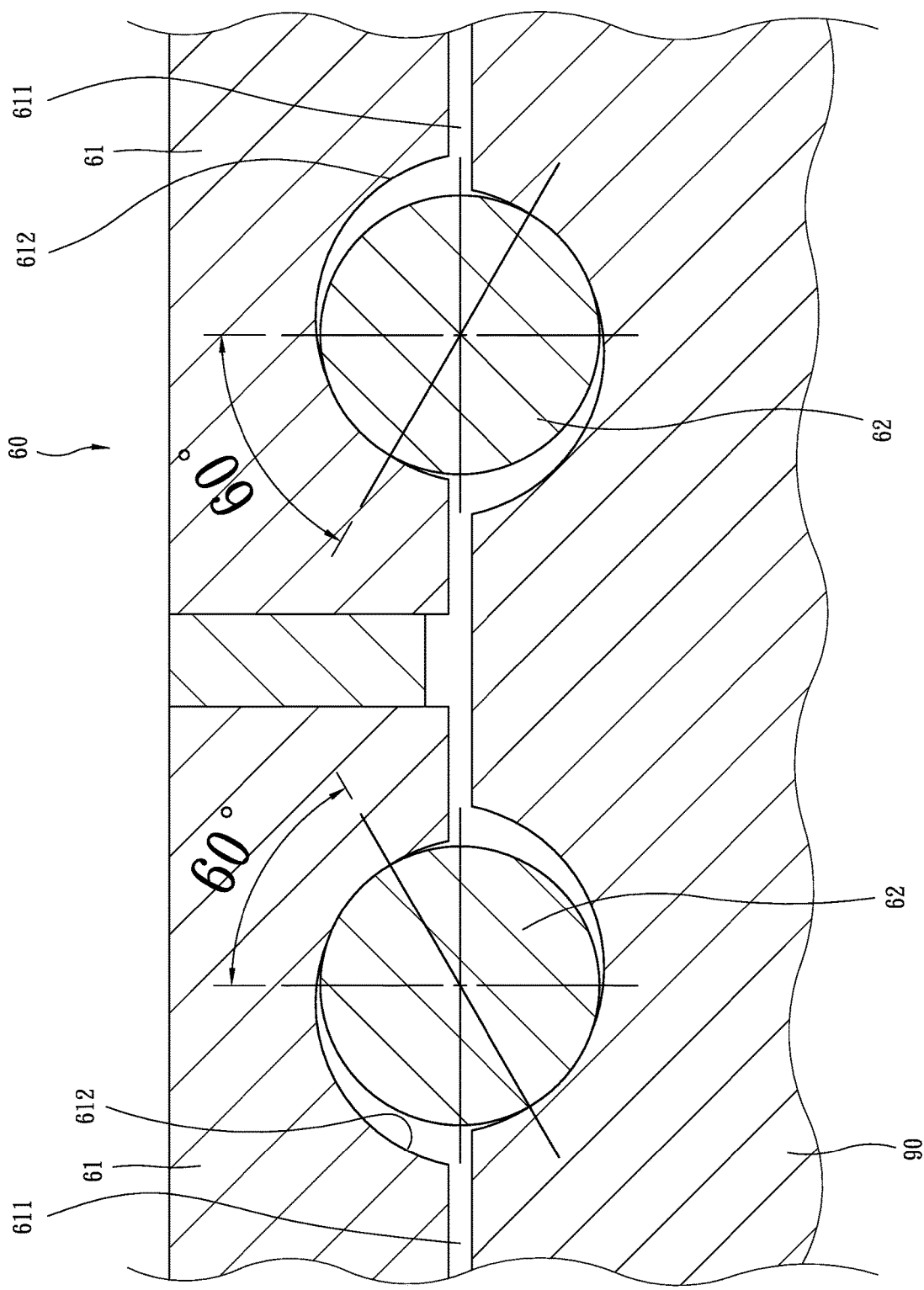
FIG. 11 shows that the two third contact angles of the second embodiment of the present invention is 60 degrees.

The second dual nut unit 50 comprises two second nuts 51 and multiple second balls 52. The two second nuts 51 are integral with each other. Each second nut 51 has a second passage 511 and a second spiral groove 512 defined in the inner surface of the second passage 511. The second balls 52 are located in the second spiral groove 512 and contact the inner surface of the second spiral groove 512 of each second nut 51 by a second contact angle which is 50 degrees. The two second contact angles that are respectively located in the two second nuts 51 are in opposite directions as shown in FIG. 10.

The third dual nut unit 60 includes two third nut 61 and multiple third balls 62. The two third nuts 61 are integral with each other. Each of the third nuts 61 has a third passage 611. A third spiral groove 612 is defined in the inner surface of each of the third passages 611. The third balls 32 are located in the third spiral grooves 612 and contact the inner surface of the third spiral groove 612 of each third nut 61 by a third contact angle which is 60 degrees. The third contact angles that are respectively located in the two third nuts 61 are in opposite directions as shown in FIG. 10.

Figure 12:
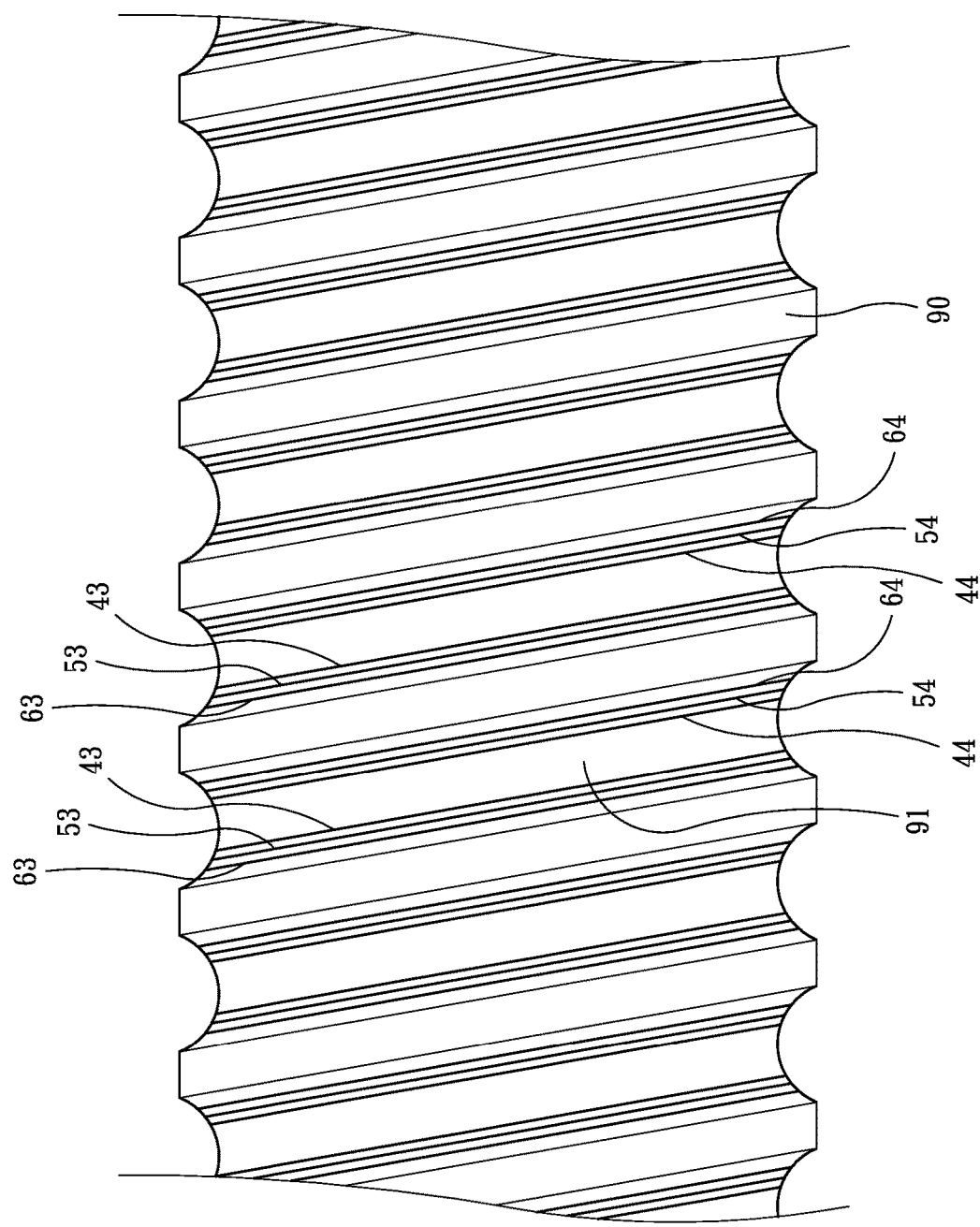
FIG. 12 shows the first, second and third wearing traces in the second embodiment are formed along the screw.

After a period of time of use, the first dual nut unit 40 creates two first wearing traces 43 and two fourth wearing traces 44 along the inner surface of the primary spiral groove 91. The first dual nut unit 40 is replaced with the second dual nut unit 50. Again, two second wearing traces 53 and two fifth wearing traces 54 are formed along the inner surface of the primary spiral groove 91 by the second dual nut unit 50 after a period of time of use. Two third wearing traces 63 and two sixth wearing traces 64 are formed along the inner surface of the primary spiral groove 91 by the third dual nut unit 60 after a period of time of use. The first, fourth, second, fifth, third and sixth wearing traces 43, 53, 63, 44, 54, 64 are not overlapped with each other as shown in FIG. 12.

The present invention can be used on single nut and dual nuts, and the screw 90 has longer life for use.

While we have shown and described the embodiment in accordance with the present invention, it should be clear to those skilled in the art that further embodiments may be made without departing from the scope of the present invention.

What is claimed is:

1. A ball screw comprising:
a screw having a primary spiral groove defined in an outer surface thereof;
a first dual nut unit having two first nuts and multiple first balls, the two first nuts being integral with each other, each first nut having a first passage and a first spiral groove defined in an inner surface of the first passage, the first balls located in the first spiral groove and contacting an inner surface of the first spiral groove of each first nut by a first contact angle, the two first contact angles respectively located the two first nuts being in opposite directions;
a second dual nut unit having two second nuts and multiple second balls, the two second nuts being integral with each other, each second nut having a second passage and a second spiral groove defined in an inner surface of the second passage, the second balls located in the second spiral groove and contacting an inner surface of the second spiral groove of each second nut by a second contact angle, the two second contact angles respectively located in the two second nuts being in opposite directions, the first contact angles being different from the second contact angles, and
the first dual nut unit and the second dual nut unit being alternatively cooperated with the screw, when two first wearing traces and two fourth wearing traces are formed along the inner surface of the primary spiral groove by the first dual nut unit, the first dual nut unit is replaced with the second dual nut unit, two second wearing traces and two fifth wearing traces are formed along the inner surface of the primary spiral groove by the second dual nut unit, the first, fourth, second and fifth wearing traces are not overlapped with each other.

2. The ball screw as claimed in claim 1, further comprising a third dual nut unit which includes two third nut and multiple third balls, the two third nuts being integral with each other, each of the third nuts having a third passage, a third spiral groove defined in an inner surface of each of the third passages, the third balls located in the third spiral grooves and contacting an inner surface of the third spiral groove of each third nut by a third contact angle, the third contact angles respectively located in the two third nuts being in opposite directions, the third contact angles being different from the first contact angles and the second contact angles, the third dual nut unit being cooperated with the screw, two third wearing traces and two sixth wearing traces being formed along the inner surface of the primary spiral groove by the third dual nut unit, the first, second, third, fourth, fifth and sixth wearing traces are not overlapped with each other.

3. A method for using a ball screw, comprising:
a step of having a screw: the screw having a primary groove;
a step of having a first nut unit: the first nut unit having at least one first nut and multiple first balls, the at least one first nut having a first passage, the screw extending through the first passage, the first passage having a first spiral groove defined in an inner surface thereof, the first balls located in the first spiral groove, the first balls contacting an inner surface of the first spiral groove by a first contact angle;
a step of having a second nut unit: the second nut unit having at least one second nut and multiple second balls, the at least one second nut having a second passage, the second passage having a second spiral groove defined in an inner surface thereof, the second balls located in the second spiral groove, the second balls contacting an inner surface of the second spiral groove by a second contact angle which is different from the first contact angle;
a step of replacing the first nut unit with the second nut unit: when a first wearing trace is formed along the screw by the first balls, the first nut unit is removed from the screw and the second nut unit is connected to the screw, the second nut unit is removed from the screw when a second wearing trace is formed along the screw by the second balls, the first and second wearing traces are not overlapped with each other.

4. The method as claimed in claim 3, further comprising a third nut unit which includes at least one third nut and multiple third balls, the at least one third nut having a third passage, a third spiral groove defined in an inner surface of the third passage, the third balls located in the third spiral groove and contacting an inner surface of the third spiral groove by a third contact angle, the third contact angle being different from the first contact angle and the second contact angle, when the second wearing trace is formed along the screw by the second nut unit, the second nut unit is removed from the screw and the third nut unit being cooperated with the screw, a third wearing trace being formed along the screw by the third nut unit, the first, second and third wearing traces are not overlapped with each other.

5. The method as claimed in claim 4, wherein the third nut unit is a third dual nut unit and includes two third nuts and the third balls, the two third nuts are integral with each other, the third balls are located in the third spiral grooves of the two third nuts and contact an inner surface of the third spiral groove of each third nut by a third contact angle, the third contact angles that are respectively located in the two third nuts are in opposite directions.

6. The method as claimed in claim 3, wherein the first nut unit is a first dual nut unit and includes two first nuts and the multiple first balls, the two first nuts are integral with each other, the first balls are located in the first spiral grooves of the two third nuts and contact an inner surface of the first spiral groove of each first nut by the third contact angle, the third contact angles that are respectively located in the two first nuts are in opposite directions, the second nut unit is a second dual nut unit and includes two second nuts and the multiple first balls, the two second nuts are integral with each other, the second balls are located in the second spiral grooves of the two second nuts and contact an inner surface of the second spiral groove of each second nut by the second contact angle, the second contact angles that are respectively located in the two second nuts are in opposite directions.

* * * * *